United States Patent
De La Fuente Leis et al.

(10) Patent No.: US 12,180,111 B2
(45) Date of Patent: Dec. 31, 2024

(54) METHOD FOR MODIFYING A VITREOUS MATERIAL

(71) Applicants: CONSEJO SUPERIOR DE INVESTIGACIONES CIENTÍFICAS, Madrid (ES); UNIVERSIDAD DE ZARAGOZA, Saragossa (ES)

(72) Inventors: Xermán Francisco De La Fuente Leis, Saragossa (ES); Luis Carlos Estepa Millán, Saragossa (ES); Luis Alberto Angurel Lambán, Saragossa (ES)

(73) Assignee: CONSEJO SUPERIOR DE INVESTIGACIONES CIENTÍFICAS and UNIVERSIDAD DE ZARAGOZA (ES)

( * ) Notice: Subject to any disclaimer, the term of this patent is extended or adjusted under 35 U.S.C. 154(b) by 0 days.

(21) Appl. No.: 17/909,236

(22) PCT Filed: Mar. 1, 2021

(86) PCT No.: PCT/ES2021/070149
§ 371 (c)(1),
(2) Date: Sep. 2, 2022

(87) PCT Pub. No.: WO2021/176123
PCT Pub. Date: Sep. 10, 2021

(65) Prior Publication Data
US 2023/0322618 A1     Oct. 12, 2023

(30) Foreign Application Priority Data
Mar. 2, 2020   (ES) .................. P202030176

(51) Int. Cl.
| | |
|---|---|
| B32B 17/06 | (2006.01) |
| B23K 26/08 | (2014.01) |
| B23K 26/352 | (2014.01) |
| B23K 26/60 | (2014.01) |

(Continued)

(52) U.S. Cl.
CPC ........ C03C 23/0025 (2013.01); B23K 26/083 (2013.01); B23K 26/0869 (2013.01);
(Continued)

(58) Field of Classification Search
CPC .. C03C 23/0025; B23K 26/083; B23K 26/352
(Continued)

(56) References Cited

U.S. PATENT DOCUMENTS 6,566,626 B2 * 5/2003 Gaissinsky ............... C03C 4/04
                                                          219/121.69
7,164,519 B2 * 1/2007 Han ..................... B23K 26/0736
                                                          359/216.1

(Continued)

FOREIGN PATENT DOCUMENTS

| CN | 105645747 A | 6/2016 |
|---|---|---|
| CN | 105800922 A | 7/2016 |

(Continued)

OTHER PUBLICATIONS

Deprez et al., "Glass Marking with CO2 Laser: Experimental Study of the Interaction Laser-Material", Journal, 2012, p. 32-39, vol. 2, Journal of Surface Engineered Materials and Advanced Technology.
(Continued)

*Primary Examiner* — Lauren R Colgan
(74) *Attorney, Agent, or Firm* — Hayes Soloway PC (57) ABSTRACT

Vitreous material treatment uses a piece of vitreous material having two opposite faces and a laser emission beam source. The vitreous material is heated, and a laser beam radiated on one of the faces of the vitreous material to scan following a line surpassing the opposite edges of the face of the vitreous material while the vitreous material oscillates along a path. The scan is performed while the vitreous material is heated. The vitreous material is cooled. The laser beam scan follows a line surpassing the opposite edges of the face. The scan
(Continued)

performed oscillating between a first point and a second point.

13 Claims, 4 Drawing Sheets

(51) Int. Cl.
  *C03C 23/00* (2006.01)
  *B23K 103/00* (2006.01)
(52) U.S. Cl.
  CPC ............ *B23K 26/352* (2015.10); *B23K 26/60* (2015.10); *C03C 23/007* (2013.01); *B23K 2103/54* (2018.08)
(58) Field of Classification Search
  USPC .............................. 428/426, 410; 219/121.85
  See application file for complete search history.

(56) References Cited

U.S. PATENT DOCUMENTS

| | | | | |
|---|---|---|---|---|
| 8,278,589 | B2* | 10/2012 | Millan | B23K 26/12 219/121.85 |
| 10,588,183 | B2* | 3/2020 | Tecco | B08B 7/0042 |
| 10,934,603 | B2* | 3/2021 | Tecco | B23K 26/073 |
| 2009/0203513 | A1* | 8/2009 | Hashimoto | C03C 3/089 501/72 |
| 2009/0230105 | A1* | 9/2009 | Estepa Millan | B23K 26/082 219/121.85 |

FOREIGN PATENT DOCUMENTS

| | | |
|---|---|---|
| CN | 107902883 A | 4/2018 |
| CN | 207671917 U | 7/2018 |
| ES | 2294919 A1 | 4/2008 |

OTHER PUBLICATIONS

Wesang et al., "Local Heat Tempering with Laser Radiation for Brilliant Colors on Glass Surfaces", Journal, Aug. 2018, p. 03258-1-03258-5, vol. 30, No. 3, Journal of Laser Applications.

Fernandez Navarro et al., "Glass Surface Treatments", Journal, 1985, p. 299-314, vol. 24, No. 5, Bol. Soc. Esp. Ceram. Vidr.

* cited by examiner

METHOD FOR MODIFYING A VITREOUS MATERIAL

CROSS-REFERENCE TO RELATED APPLICATIONS AND PRIORITY

This patent application claims priority from PCT Application No. PCT/ES2021/070149 filed Mar. 1, 2021, which claims priority from Spanish Patent Application No. P202030176 filed Mar. 2, 2020. Each of these patent applications are herein incorporated by reference in their entirety.

TECHNICAL FIELD

The present invention is comprised in the materials technology sector, specifically the materials sector.

STATE OF THE ART

Glass is a material which has characteristics of transparency, chemical inalterability, and an absence of porosity, rendering it a material that is difficult to substitute in certain applications. The main drawback of glass is its relative low mechanical strength.

The growing demands placed on its applications have led to the development of an entire series of surface treatments, which have been classified into three major groups: subtractive, additive, and ion exchange treatments [Fernández J. M.; Durán, A. *Tratamientos de la superficie del vidrio* Boletín de la Sociedad Espanola de Cerámica y Vidrio 24-58 (1984)].

For the purpose of improving mechanical properties, so-called tempering methods have been used. There are basically two methods for tempering glass: chemical and thermal tempering. The most common is thermal tempering, which consists of reheating pieces of glass to an approximate temperature of 700° C. in a vertical or horizontal furnace. After heating, a step of forced cooling is performed by means of blown air, whereby the outer surfaces of pieces of glass shrink, while the core of the glass maintains a high temperature and tends to cool down at a slower rate. Tempering generates compressive stresses in a permanent manner on the two faces of the glass, while at the same time tensile stresses are induced within the glass. For a crack to spread, it is necessary for the material surrounding the crack to be subjected to tensile stresses. In the case of tempered glass, these tensile stresses must be greater than the compressive stresses generated during tempering. For this reason, the strength of glass increases once it has been tempered. In principle, the theoretical fracture stress value "$\sigma_0$" of tempered glass approaches 500 MPa, compared to that of conventional glass of 50 MPa. In reality, and given the lack of cooling uniformity, the maximum that is reached statistically ranges between 200 and 300 MPa, between 4 and 6 times that of the same untempered glass.

Document CN207671917 describes a utility model relating to a thin glass tempering device comprising a conveying roller for the glass, a heating furnace, a tempering mechanism, and an upper and lower laser heating device located at the outlet of the heating furnace. Said patent document does not provide any data relating to the temperature or type of laser; it only mentions that the value of the surface stress of the tempered thin glass is improved.

Patent application CN107902883 is similar to the aforementioned utility model although with more specifications, but values of the surface stress obtained after tempering are not provided. The heating temperature used is from 50 to 60° C. above the glass transition temperature. The laser heating device is also positioned at the outlet of the heating furnace.

Document CN105645747 describes a glass tempering method, in which the glass is conveyed through a furnace where a general softening at a temperature comprised between 450-850° C. and auxiliary heating by means of the laser at a temperature between 600-1200° C. will be performed.

CN105800922 also relates to a method for tempering glass, comprising a glass tempering furnace in which glass is continuously conveyed from the heating section to the tempering section by means of a conveyor device, wherein the heating process in the heating section is performed by means of a laser method. The range of working temperatures is comprised between 450° C. and 1200° C., and in the region referred to as the second region, between 600° C. and 1200° C.

The article "*Local heat tempering with laser radiation for brilliant colors on glass surfaces*" [K. Wesang et al. Journal of Laser Applications (2018) 30 (3)] presents a research paper in which an industrial process for the local tempering of color in glass panes using laser radiation is developed. The applied pigment is locally burned on the surface of the glass by means of laser radiation, fixing it to the surface of the glass. In this case, a conventional furnace is not used for the treatment.

The article "*Glass Marking with $CO_2$ Laser: Experimental Study of the Interaction Laser*"[P. Deprez et al. Journal of Surface Engineered Materials and Adv. Tech. (2012), 2, 32-39] analyzes the influence of marking parameters such as the interaction time laser-glass, laser power, shooting time, etc., on micromarking precision.

Patent document U.S. Pat. No. 6,566,626B2 describes a method and apparatus for generating colored images of at least one color within a light-sensitive glass sample. The apparatus comprises a pulsed laser beam source off the range of the UV spectrum, a focusing device, a relative two-dimensional and three-dimensional displacement device, and a furnace for heating the light-sensitive glass sample at temperatures in the range of 150-550° C., after having passed through laser irradiation.

Lastly, Spanish patent application published as ES2294919A1 describes a continuous furnace to which a laser is coupled for the surface treatment of ceramic materials.

Based on the study of the prior art, it can be deduced that there is a need to consider alternatives with respect to conventional tempering methods to improve the mechanical properties of vitreous materials and reduce their defects.

DESCRIPTION OF THE INVENTION

A treatment of a vitreous material is performed by means of using a laser during a thermal treatment comprising different steps. In one step of said treatment, at a given temperature, the material is irradiated with a laser which can emit in the mid-IR range of the electromagnetic spectrum, in a configuration in which the laser beam describes a movement in a direction which can be perpendicular to the forward movement direction of the vitreous material such that treatment is performed with the laser on a part of the surface of the vitreous material. This process can generate a thin layer of molten material on the irradiated surface of the glass, reducing surface defects and generating a layer either decorated with a wide range of colors, or a natural layer without apparent changes, with a more robust finish against mechanical aggressions.

The first aspect of the present invention is a method of treating a vitreous material comprising the following steps:
 i. providing
    a. a piece of vitreous material; wherein said piece of vitreous material comprises at least two opposite faces; and
    b. at least one laser emission source;
 ii. heating the piece of vitreous material of step (i) at a temperature comprised between 400 and 640° C.;
 iii. applying at least one laser beam with the at least one laser emission source of step (i) on at least one of the faces of the piece of vitreous material of step (ii), performing a scan following a line surpassing the two opposite edges of the face of the piece of vitreous material;
    while the piece of vitreous material is moved following a path forming an angle of between 30 and 120° with the scan line of the laser; wherein said scan is performed while the piece of vitreous material is at a temperature comprised between 400° C. and 640° C.;
 iv. heating the piece of vitreous material obtained in step (iii) at a temperature comprised between 450° C. and 650° C.; and
 v. cooling the piece of vitreous material of step (v).

A second inventive aspect of the invention relates to a system adapted for performing any of the particular embodiments of the method of the present invention, which system comprises;
 a furnace comprising
    a thermally insulated chamber comprising at least two openings and temperature control means;
    a conveyance system adapted for performing a movement following a path going through said terminally insulated chamber;
 at least one laser emission source;
 wherein the at least one laser emission source is positioned on the outside of the thermally insulated chamber of the furnace; and
 wherein the chamber of said furnace has one opening of its at least two openings adapted for the laser emission originating from the at least one laser emission source to enter the thermally insulated chamber.

A third inventive aspect of the invention relates to the modified vitreous material obtainable by means of any of the particular embodiments of the method of the invention.

A particular embodiment of the invention is a method of the surface modification of glass by means of laser comprising the following steps:
 introducing a piece of vitreous material in a continuous furnace;
 applying heating to the piece of vitreous material in a first heating region defined in the continuous furnace at a temperature comprised between 400 and 640° C.;
 applying a laser beam with back-and-forth scanning movement on at least one face of the piece of vitreous material in a second region defined in the continuous furnace at a temperature comprised between 400° C. and 650° C.;
 applying a second heating to the piece of vitreous material in a third region defined in the furnace at a temperature comprised between 450° C. and 650° C.;
 cooling the piece of vitreous material on which the laser beam has been applied in a final region defined in the continuous furnace until reaching room temperature.

In a preferred embodiment of the method of the invention, the vitreous material is selected from materials having an essentially two-dimensional geometry, preferably sheets of glass. In the present context, essentially two-dimensional is understood to mean that the third dimension of a piece of vitreous material does not exceed 3% of the largest of the other two dimensions. Pieces of another type that can be treated include more complex geometries, such as plates, for example. The vitreous material can be previously decorated.

In a particular embodiment, the application of the laser beam on the piece of vitreous material is carried out by means of a back-and-forth scanning movement at a speed greater than 10 m/s, such that the scanning surpasses the lateral boundaries of the piece. Preferably, the laser beam originates from a $CO_2$ laser emission source, with a power density greater than 0.1 kW, preferably greater than 0.25 kW, which is set according to the width of the piece.

In a particularly preferred embodiment, the application of the laser beam with back-and-forth scanning movement is performed on the two faces of the piece of vitreous material with an essentially two-dimensional geometry. This application on the two faces of the piece of vitreous material can be simultaneous or consecutive.

The main advantages of the method object of the present invention with respect to tempering or surface treatment processes described in the state of the art are:
 use of temperatures that can be lower than 580° C. based on the type of vitreous material and the corresponding curvature limits, without generating structural damage in the obtained product,
 obtaining vitreous materials with mechanical properties better than those of untreated vitreous materials, particularly in relation to stresses being uniformly distributed throughout the volume of the piece, which allows said pieces to be cut without fracturing or shattering.

DETAILED DESCRIPTION OF THE INVENTION

Devices for achieving a surface scan of a given surface with a laser ray by means of galvanometric mirrors are well known. Temperatures of several hundreds of degrees centigrade could thereby be achieved in this surface for a number of purposes. However, it has surprisingly been found that when this technique is applied to pieces of vitreous materials, as well as other similar materials, although the desired temperatures are reached on the treated surface, the result is completely unsatisfactory due to the cracking of the treated surface as a result of the mechanical stresses generated and the roughness formed therein.

Likewise, furnaces as material heating, treatment, and transformation systems have also been known for many years. The incorporation of suitable instruments allows for a much more effective control and use of the furnaces. However, in some processes performed in a furnace, structural modifications and therefore unwanted modifications of the properties of the materials occur. On other occasions, the significant physical differences, such as the melting point of the materials, make it impossible to perform certain processes by means of only a conventional furnace, so it is necessary to develop systems which incorporate other elements for processing the material in addition to a furnace.

The first aspect of the present invention is a method of treating a vitreous material comprising the following steps:
i. providing
   a. a piece of vitreous material; wherein said piece of vitreous material comprises at least two opposite faces; and
   b. at least one laser emission source;
ii. heating the piece of vitreous material of step (i) at a temperature comprised between 400 and 640° C.;
iii. applying at least one laser beam with the at least one laser emission source of step (i) on at least one of the faces of the piece of vitreous material of step (ii), performing a scan following a line surpassing the two opposite boundary edges of the face of the piece of vitreous material;
   while the piece of vitreous material moves by means of a translational movement following a path forming an angle of between 30 and 120° with the scan line of the laser; wherein said scan is performed while the piece of vitreous material is at a temperature comprised between 400° C. and 640° C.;
iv. heating the piece of vitreous material obtained in step (iii) at a temperature comprised between 450° C. and 650° C.; and
v. cooling the piece of vitreous material of step (iv)

In a particular embodiment, the piece of vitreous material of step (i) of the method of the present invention has a polyhedral shape; preferably it is a sheet.

In a particular embodiment, the faces of the piece of vitreous material of step (i) of the method of the present invention have defined boundaries or edges; preferably they comprise two opposite edges.

In a particular embodiment, the piece of vitreous material of step (i) is a piece of glass, particularly a sheet of glass; preferably a piece of untempered glass, particularly a sheet of untempered glass. Non-limiting examples of glasses suitable for the piece of vitreous material of step (i) are soda-lime glass, lead alkali glass, borosilicate glass, aluminosilicate glass, glasses having 96% by weight silicon dioxide, or fused silicon glass. In a more particular embodiment, the piece of vitreous material of step (i) is a piece of soda-lime glass; preferably untempered soda-lime glass.

In a particular embodiment, the laser emission source comprises a $CO_2$ laser; preferably a continuous $CO_2$ laser. Preferably, the laser emission source of the invention emits a laser beam; preferably a focused laser beam; more preferably focused on one of the faces of the piece of vitreous material; more preferably focused on the surface of one of the faces of the piece of vitreous material of the invention.

In a particular embodiment, the laser emission source has a power equal to or greater than 0.1 kW, preferably greater than 0.25 kW, preferably greater than 1 kW; more preferably greater than 1.5 kW; even more preferably between 1.5 kW and 2.5 kW; in a particular embodiment, lasers of up to 8 kW or even more can be used.

In a particular embodiment, said laser beam is focused on a surface (for example, reaching one of the faces of the piece of vitreous material) in the form of a dot, circle, ellipse, continuous or discontinuous line, rectangle, square, or star; more preferably in the form of a dot or circle. In a particular embodiment, said laser beam generates an increase in temperature on the surface where it is focused; preferably of hundreds of degrees centigrade, particularly between 650° C. and 3000° C., particularly more than 1500, 1600, and up to more than 1800 degrees centigrade. In a particular embodiment, said laser beam melts the vitreous material of the surface of the vitreous piece where it is applied; it preferably melts the vitreous material to a depth of tens of mm, preferably between 0.001 and 1 mm; more preferably between 0.001 and 0.100 mm, between 0.010 and 0.200, or between 0.010 and 0.090 mm. In a more particular embodiment, said laser beam melts the vitreous material of the surface of the vitreous piece where it is applied by performing a scan following a line surpassing the opposite edges of the face of the piece of vitreous material.

In a particular embodiment, step (ii) of the method of the present invention comprises heating the piece of vitreous material of step (i) at a temperature of between 400 and 640° C.; preferably between 450 and 600° C.; more preferably between 480 and 590° C.; more preferably from 490 to 580° C., 500 to 570° C., 510 to 560° C., 520 to 540° C.; even more preferably at 490, 500, 510, 530, 540, 550, 560, 570, 580, or 590° C., or at 575, 580, or 585° C.

Step (iii) of the method of the invention relates to applying at least one laser beam with at least one laser emission source on at least one of the faces of the piece of vitreous material, performing a scan following a line surpassing the opposite edges of the face of the piece of vitreous material, while the piece of vitreous material is moved following a path forming an angle of between 30 and 120° with the scan line of the laser; wherein said scan is performed while the piece of vitreous material is at a temperature of between 400° C. and 640° C. Preferably, said scan is performed while the piece of vitreous material of step (ii) is at a temperature of between 420 and 620° C., between 440 and 600° C., between 460 and 580° C., between 480 and 560° C., or between 500 and 540° C.; more preferably between 400 and 440° C., between 440 and 480° C., between 480 and 520° C., between 520 and 560° C., between 560 and 600° C., or between 600 and 640° C.

In a particular embodiment, the laser beam scan of the invention is a back-and-forth scan following a line surpassing the opposite edges of the face of the piece of vitreous material of step (iii) of the method of the invention, i.e., the laser beam of the invention performs a back-and-forth movement.

In a particular embodiment, the laser beam scan of the invention follows a line surpassing the opposite edges of the face of the piece of vitreous material of step (iii) of the method of the invention, said scan being performed in a direction from a first point to a second point (for example, from left to right); once said laser beam reaches the second point, it performs the same scan but in the opposite direction (for example, from right to left) until reaching the first point; preferably, this laser beam scanning movement is repeated over time; preferably the first and second points are located along the line surpassing the opposite edges of the face of the piece of vitreous material, but said points are not located on the piece of vitreous material.

In a particular embodiment, the laser beam scan follows a straight or curved line surpassing the opposite edges of the face of the piece of vitreous material; preferably it follows a straight line.

In a more particular embodiment, the laser beam scan follows a straight or curved line surpassing the opposite edges of the face of the piece of vitreous material; said scan stops and is repeated in the same way either in the same direction or else in the opposite direction.

In a particular embodiment, a laser beam strikes a face of the piece of vitreous material, preferably a sheet of glass, while another beam strikes the opposite face.

The laser beam scan of the present invention is performed at a constant or non-constant speed; preferably at a constant speed.

In a particular embodiment, the laser beam scan of the present invention is performed at a speed equal to or greater than 1 m/s; preferably greater than 5 m/s; more preferably between 6 and 50 m/s; much more preferably it is selected from 5, 10, 15, 20, 25, 30, or 35 m/s; even more preferably it is 25 m/s.

In a particular embodiment, step (iii) of the method of the present invention is performed at a temperature of between 400 and 640° C.; preferably between 450 and 600° C.; more preferably between 480 and 590° C.; more preferably at 490, 500, 510, 520; even more preferably at around 500° C.

In a particular embodiment, step (iii) of the method of the present invention comprises heating the piece of vitreous material of step (ii) at a temperature of between 400 and 640° C.; preferably between 450 and 600° C.; more preferably between 480 and 590° C.; more preferably at 490, 500, 510, 520; even more preferably at around 500° C.

In a particular embodiment, the laser beam and the face of the piece of vitreous material (for example, between the plane of the face of the piece of vitreous material and the longitudinal axis of symmetry of the incident laser beam) form an acute or right angle; preferably between 15 and 90°; preferably between 25 and 90°; more preferably between 45 and 90°.

In a particular embodiment, applying a laser beam with the laser emission source of the invention on one of the faces of the piece of vitreous material is to focus the laser emission of said laser emission source on the surface of one of the faces of the piece; preferably in the form of a dot.

More particularly, performing a scan with the laser beam of the invention is to move the focused laser from a first point to a second point following a line that can be rectilinear or curvilinear. Even more particularly, during said scan the edges of the piece of vitreous material, that is, the boundaries of the face of the piece of vitreous material being treated, are surpassed, for example, if the face of the piece to be treated forms a square with dimensions of 15×15 cm, the laser beam scan travels along a straight line of 17 cm, surpassing the two sides or edges of said square face in addition to its surface forming a line or band of molten material; preferably during this treatment the piece of vitreous material is at a temperature greater than 400° C.

Even more particularly, performing a scan with the laser beam of the invention is to move the focused laser from a first point to a second point in a direction following a line that can be rectilinear or curvilinear surpassing the edges of the piece of vitreous material to be treated; and when it reaches the second point, the laser beam is moved from said second point to the first point in the opposite direction following a line that can be rectilinear or curvilinear and surpassing the edges of the piece of vitreous material to be treated; preferably this movement of the laser beam is repeated successively; more preferably it is repeated at a constant rate; even more preferably the movement of the laser beam is back-and-forth. In a particular embodiment, said line is rectilinear.

In a particular embodiment, the laser beam scan from a first to a second point in one direction treats a first region of the piece of glass, and the laser beam scan from said second point to the first point in the opposite direction traces a second different region of the piece of glass.

In a particular embodiment, in step (iii) of the method of the invention, the piece of vitreous material is moved following a path forming an angle of between 30 and 120° with the scan line of the laser; preferably the piece of vitreous material is moved by means of a translational movement; more preferably following a rectilinear or curvilinear line; even more preferably following a straight line.

In the context of the present invention, a "translational movement" is considered a movement in which the position of an object is modified.

In a particular embodiment, in step (iii) of the method of the invention, the piece of vitreous material is moved by means of a translational movement following a path in the form of straight line forming an angle of 90° with the scan line of the laser; preferably wherein said scan line of the laser is straight.

Preferably, in step (iii) of the method of the invention, the piece of vitreous material is moved by means of a translational movement following a straight line perpendicular to the scan line of the laser.

In a particular embodiment, in step (iii) of the method of the invention, the movement of the piece of vitreous material is performed at a constant or non-constant speed; preferably constant.

In a particular embodiment, the movement of the piece of vitreous material is performed at a speed equal to or greater than 1 m/h; preferably it is comprised between 2 and 180 m/h; more preferably it is comprised between 20 and 50 m/h, more preferably between 5 and 20 m/h.

In a more particular embodiment, the movement of the piece of vitreous material is performed at a speed equal to or greater than 1 m/h and equal to or less than 10 m/h; preferably equal to or greater than 2 m/h and equal to or less than 8 m/h; more preferably equal to or greater than 3 m/h and equal to or less than 6 m/h; even more preferably around 5 m/h.

In a more particular embodiment, the movement of the piece of vitreous material is performed at a speed equal to or greater than 1 m/h and equal to or less than 10 m/h and the laser beam scanning movement of the present invention is performed at a speed of between 6 and 50 m/s; much more preferably it is selected from 5, 10, 15, 20, 25, 30, or 35 m/s; even more preferably it is 25 m/s.

The inventors have observed that forward movement or movement speeds of the piece of vitreous material in step iii of between 5 and 20 m/hour result in a greater improvement in the breaking stress values of the pieces.

In a particular embodiment, in step (iv) of the method of the present invention the piece coming from step (iii) is heated such that it is at a temperature of between 400 and 650° C.; preferably between 420 and 630° C., between 440 and 610° C., between 460 and 610° C., between 480 and 590° C., between 500 and 570° C., between 520 and 550° C.; more preferably between 400 and 440° C., between 440 and 480° C., between 480 and 520° C., between 520 and 560° C., between 560 and 600° C. or between 600 and 640° C.; even more preferably temperatures of 490, 500, 510, 520, 530, 540, 550, 560, 570, 580, or 590° C.; even more preferably of 575, 580, or 585° C.

In a particular embodiment, step (iv) of the method of the present invention comprises heating the piece of vitreous material at a temperature of between 400 and 650° C.; preferably between 450 and 600° C.; more preferably between 480 and 590° C.; preferably of 490, 500, 510, 520, 530, 540, 550, 560, 570, 580, or 590° C.; even more preferably of 575, 580, or 585° C.

In a particular embodiment, the temperature at which the piece of vitreous material is heated in step (iv) is greater than the temperature of said piece of vitreous material in step (iii).

In a particular embodiment, step (v) of the method of the present invention comprises cooling the piece of vitreous material until reaching room temperature; preferably comprised between 15 and 35° C.; more preferably it comprises gradually cooling the piece of vitreous material; preferably in the open air. Said step can be performed by any untempered glass cooling means. Particularly, said step is not a step of tempering glass. In a particular embodiment, step (v) of cooling of the method of the present invention does not apply additional cooling means. In a more particular embodiment, step (v) of cooling of the method of the present invention comprises cooling the piece of vitreous material of step (iv) at a speed of less than 70° C./min; preferably less than 60° C./min; more preferably less than 50° C./min; more preferably less than 40, 30, or 20° C./min.

Preferably, the method of the invention is performed inside a furnace; more preferably steps (ii), (iii), (iv), and (v) of said method are performed in different regions of the furnace, wherein said regions are at different temperatures; even more preferably the furnace is continuous. In a particular embodiment, the furnace comprises a conveyor belt on the surface of which the piece of vitreous material is placed, wherein said conveyor belt moves following a path forming an angle of between 30 and 120° with the scan line of the laser; preferably following a straight line; more preferably following a straight line perpendicular to the laser scan line.

In a particular claim, steps (ii), (iii) (iv), and/or (v) of the method of the invention last for a time between 0.1 and 24 h; preferably between 1 minute and 10 h; more preferably between 5 minutes and 5 h; even more preferably between 10 minutes and 3 h.

In a particular claim, step (v) of the method of the invention lasts for more than 20 minutes; preferably more than 1 h.

In a particular embodiment, applying a laser beam on one of the faces of the piece of vitreous material in step (iii) of the method of the invention is to contact said laser beam with one of the faces of the piece of vitreous material, i.e., with the surface of said face; preferably wherein said beam is focused on said surface.

In a particular embodiment, the temperature that the focused laser beam in contact with the piece of vitreous material reaches during the scan of step (iii) of the invention is greater than the heating temperatures of the piece during steps (ii), (iii), or (iv) of the method of the present invention; preferably said temperature is reached on the surface of the piece of vitreous material; more preferably it is reached up to a depth of tens of millimeters; more preferably said temperature is capable of melting said vitreous material; preferably it melts the vitreous material up to a depth of between 0.001 and 1 mm; more preferably between 0.001 and 0.100 mm, between 0.010 and 0.200, or between 0.010 and 0.090 mm.

In a more particular embodiment, the temperature that the focused laser beam in contact with the piece of vitreous material reaches during the scan of step (iii) of the invention is greater than 530° C.; preferably greater than 650° C.; more preferably it is greater than 700° C.; even more preferably it is between 650° C. and 3000° C., particularly more than 1500, 1600, and up to more than 1800 degrees centigrade.

The authors of the present invention have observed that when treating a piece of vitreous material by the method of the present invention, surprisingly its mechanical properties are significantly improved and the defects in said piece are reduced. Furthermore, the authors of the present invention have observed that by reducing the speed of movement of the piece of vitreous material during the method of the present invention, particularly by reducing the speed of movement of the piece of vitreous material during step (iii), a greater improvement of its mechanical properties, particularly the breaking stress values of the pieces, is obtained.

System

A second inventive aspect of the present invention relates to a system adapted for performing any of the particular embodiments of the method of the invention; which system comprises:

a furnace (1) comprising
a thermally insulated chamber comprising at least two openings and temperature control means;
a conveyance system adapted for performing a movement following a path going through said terminally insulated chamber;
at least one laser emission source;
wherein the at least one laser emission source is positioned on the outside of the thermally insulated chamber of the furnace; and
wherein the chamber of said furnace has one opening of its at least two openings adapted for the laser emission originating from the at least one laser emission source to enter the thermally insulated chamber; preferably for a laser beam to enter.

In a particular embodiment, the system of the invention comprises a furnace with a chamber with more than two openings, two laser emission sources positioned on the outside of the chamber of the furnace and two openings of the chamber adapted for the laser emission originating from the at least one laser emission source to enter the thermally insulated chamber through each of them; preferably for a laser beam to enter; preferably said openings are positioned in opposite positions of the sides of the chamber of the furnace; more preferably the laser beams enter the chamber perpendicular to one another.

In a particular embodiment, the furnace of the invention comprises heating means, preferably electrical resistors or gas or fuel combustion.

In a more particular embodiment, the chamber of the furnace of the invention is divided into different regions, comprising independent temperature control means; more preferably the independent temperature control means are adapted to reach the desired heating and cooling temperature values; more preferably it is divided into at least three regions; even more preferably it is divided into 4 regions.

In a particular embodiment, the furnace (1) has openings (4) suitable for introducing the laser beam, as well as a conveyance system (3) (a conveyor belt) which moves the piece of vitreous material (6) for the treatment thereof according to the method of the invention. The movement speed of the movement system may vary and be suitably regulated based on the materials used and the size. In a particular embodiment, the laser emission source (7) comprises a deflector (5) and an optical path (8) located between the laser emission source and the deflector.

In a more particular embodiment, the laser emission source emits a laser beam striking a set of mirrors reflecting said laser beam on at least one lens focusing said laser beam; preferably inside the chamber of the furnace, for example through at least one opening of said chamber, and inside the thermally insulated chamber; more preferably on the surface of the piece to be treated.

In a more particular embodiment, at least one mirror of the set of mirrors performs a rotational movement; preferably around one of its axes of symmetry; more preferably around its longitudinal axis of symmetry, even more preferably by means of a galvanometric system.

In a more particular embodiment, at least two mirrors of the set of mirrors perform a rotational movement; preferably around one of their axes of symmetry; more preferably around their longitudinal axis of symmetry, even more preferably by means of a galvanometric system; preferably the laser beam first strikes one mirror and then it strikes the other one of the at least two mirrors of the set of mirrors.

Particularly, the combination of one or more mirrors capable of rotating about their axes together with sets of lenses allows modifying the scan path of the beam and its focus on the piece to be treated. More particularly, the focused beam travels along a line (segment of length) slightly greater than the width of the piece to be treated.

In a more particular embodiment, the conveyance system of the system of the invention is adapted or configured for conveying pieces of vitreous material; preferably at a constant speed; more preferably following a straight line. The conveyance system can be, for example, a conveyor belt, a roller system, or an equivalent conveyance system.

In a more particular embodiment, the laser emission source emits a focused laser beam; preferably at one or more points or regions. Preferably the laser emission source comprises means adapted for the focusing and/or movement of said laser beam. More preferably, said means comprise a system of galvanometers or a system of lenses and/or mirrors. The laser beam can be focused by means of a system of galvanometers, lenses, and/or mirrors. Said system can be modified to impart shape to the beam and to suitably affect the type of process, material treated, and laser used.

In a particular embodiment, the laser emission source of the invention emits a pulsed laser beam; preferably each pulse of said laser beam lasts for a given time which can be controlled by the emission source.

In a particular embodiment, the laser emission source of the invention comprises a $CO_2$ laser; preferably a continuous $CO_2$ laser. Preferably, the laser emission source of the invention is capable of emitting a laser beam; preferably a focused laser beam; preferably focused on one of the faces of the piece of vitreous material; more preferably focused on the surface of one of the faces of the piece of vitreous material of the invention.

In a particular embodiment, the laser emission source of the invention has a power equal to or greater than 0.1 kW, preferably greater than 0.25 kW, preferably greater than 1 kW; more preferably greater than 1.5 kW; even more preferably between 1.5 kW and 2.5 kW; in a particular embodiment lasers of up to 8 kW or even more powerful can be used.

In a particular claim, the laser emission source of the invention emits electromagnetic radiation the wavelengths of which range from the ultraviolet to the infrared; preferably it emits radiation in the infrared; more preferably it emits electromagnetic radiation in wavelengths from 8 to 11 µm.

In a particular embodiment, the system and/or the laser emission source of the invention comprise control means; particularly the control means of the laser emission source including computer programs for controlling the intensity of the emission, the duration of the time of emission, the stopping of the emission, and/or the movements of the emitted laser beam. More particularly, the control means of the laser emission source allow controlling the work area of the laser beam and/or the focal distance of said laser beam. Even more particularly, the control means of the laser emission source allow selecting different types of laser beam scanning movement, for example the vector mode, in which the laser beam traces a continuous line.

In a particular embodiment, the system comprises control means for controlling the temperature and/or the laser beam emitted by the emission source.

Material

A third inventive aspect of the invention relates to the modified vitreous material obtainable by means of any of the particular embodiments of the method of the invention.

In a particular embodiment, the modified vitreous material of the present invention is a piece of vitreous material comprising at least two opposite faces, preferably having a polyhedral shape; more preferably it is a sheet.

In a particular embodiment, the modified vitreous material of the present invention is a piece of vitreous material comprising at least two opposite faces, wherein each of said faces is bound by a series of edges.

In a particular embodiment, the modified vitreous material of the present invention is glass; preferably untempered glass. Non-limiting examples of glasses that can be used in the invention are soda-lime glass, lead alkali glass, borosilicate glass, aluminosilicate glass, glasses having 96% by weight silicon dioxide, or fused silicon glass. In a more particular embodiment, the piece of vitreous material of step (i) is a piece of soda-lime glass; preferably untempered soda-lime glass.

In a particular embodiment, the piece of modified vitreous material of the present invention comprises a region of at least one of its faces, preferably a region of at least two of its faces, treated with a laser beam; preferably said treated region has a depth of between 0.001 and 1 mm; more preferably between 0.010 and 0.2 mm.

In a particular embodiment, the piece of modified vitreous material of the present invention comprises an area of at least one of its faces, preferably an area of at least two of its faces, treated with a laser beam; preferably a rectangular area. In a particular embodiment, the area treated with a laser beam of the piece of modified vitreous material of the present invention is the entire surface of at least one of its faces.

In a particular embodiment, the modified vitreous material of the present invention has a fracture stress value "$\sigma_0$" equal to or greater than 40 MPa, preferably comprised between 40 and 200 MPa; more preferably between 45 and 150 MPa; more preferably between 50 and 120 MPa; even more preferably between 56 MPa and 89 MPa.

In a particular embodiment, the modified vitreous material of the present invention has a defect distribution measurement value "m" comprised between 2 and 10; more preferably between 3 and 6; even more preferably between 3.5 and 5.5; even much more preferably between 4.2 and 5.3.

In a particular embodiment of the present invention, the fracture stress and/or defect distribution measurement values of the vitreous material of the invention have been calculated as the arithmetic mean of the values obtained from a significant number of measurements in different modified pieces of vitreous material (for example, more than 10 measurements or more than 40 measurements) by means of a four-point bending test in a universal test machine;

preferably said bending test has been performed using pieces of modified vitreous material in the form of sheets; particularly with the following dimensions 15 cm×15 cm×4 mm or 30 cm×30 cm×4 mm; more preferably wherein said four-point bending test has been performed by applying two support points separated 90 mm from one another and two other pressure points separated 30 mm from one another on the pieces of modified vitreous material having dimensions of 15 cm×15 cm per side×4 mm; or by applying two support points separated 180 mm from one another and two other pressure points separated 60 mm from one another on the pieces of modified vitreous material having dimensions of 30 cm×30 cm×4 mm, respectively.

Even more preferably, the values were calculated using the Weibull statistic as it is known in the art.

The inventors have observed that the region treated with a laser beam in the piece of modified vitreous material of the present invention has fewer defects and/or cracks. Furthermore, an improvement in the mechanical properties of the modified vitreous material obtainable by means of the method has been observed with respect to unmodified vitreous material.

In a particular embodiment, the piece of modified vitreous material of the present invention has a thickness of at least 0.1 mm; preferably between 0.2 and 100 mm; more preferably between 0.5 and 100 mm, more preferably between 0.5 and 70 mm; even more preferably between 1 and 20 mm; much more preferably about 4 mm.

In a particular embodiment, the piece of modified vitreous material of the present invention allows being cut in its entire volume without fracturing; preferably without multiple fracturing.

In a particular embodiment, the piece of modified vitreous material of the present invention is a sheet with dimensions of 15 cm×15 cm×4 mm or 30 cm×30 cm×4 mm.

The present invention will be described below as examples which shall not in any case limit the scope of said invention.

EXAMPLES

Embodiment of the Invention

Example 1

In the examples of the present invention, different pieces of glass were treated with a laser treatment method further comprising different steps for heating the pieces. After said treatment, the modification of the mechanical properties of the treated pieces was studied.

Furthermore, the effects of the modification of the steps of heating, of the application of different laser powers, of different movement speeds of the pieces during said treatment, and of the treatment of one or two faces of said pieces when they are in the form of a sheet have been studied in said pieces.

The device for carrying out the method object of the present invention consists of:

a continuous 2 kW $CO_2$ slab-type laser (Coherent-Rofin) coupled to a system of galvanometers, and a continuous furnace comprising a roller conveyance system 13 m long.

Pieces of glass in the form of sheets having the following dimensions of 150 mm×150 mm×10×3 mm and 30 cm×30 cm×4 mm were studied.

Figure 1:
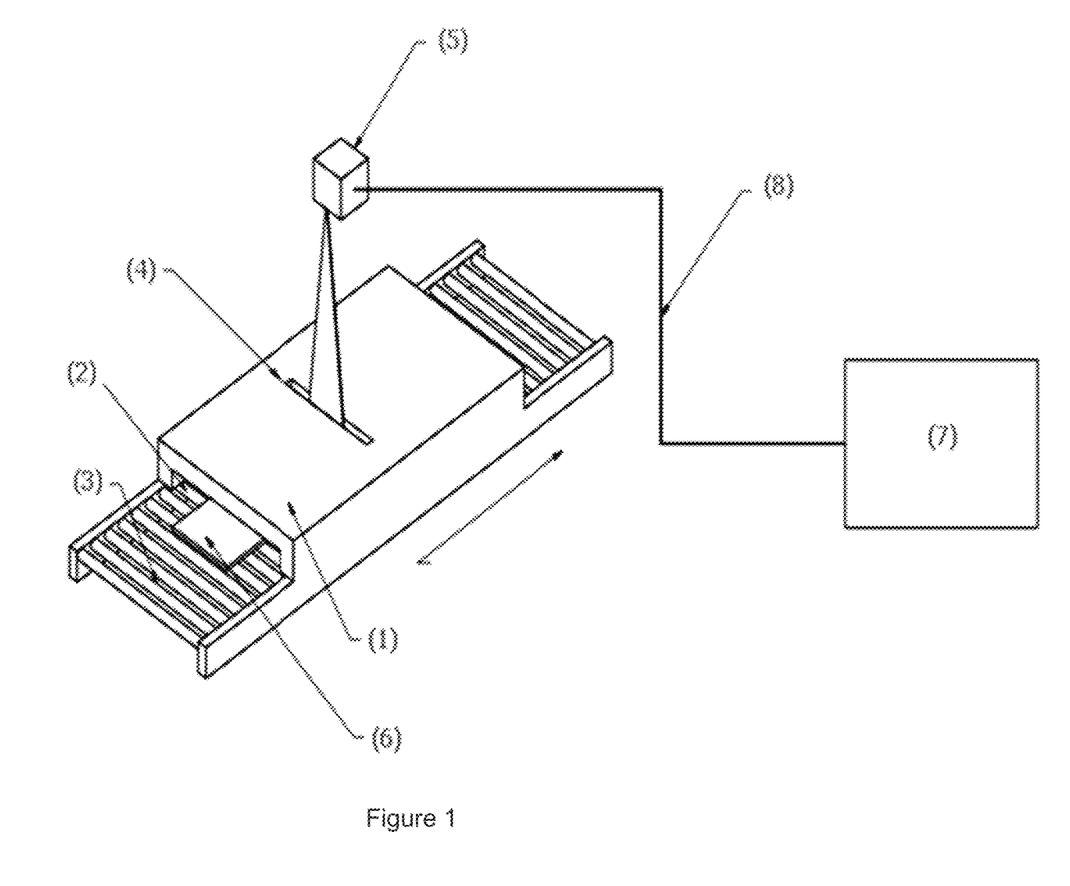
FIG. 1: Perspective view of a particular embodiment of the system of the invention (treatment on one face).

The continuous furnace (1) used has a conventional conveyance system (depicted in FIG. 1 by means of a roller conveyor, (3)) for conveying the pieces to be treated (6), which are introduced into the furnace through the opening (2). Said furnace has in its upper part an inlet (4) with a certain inclination with respect to the horizontal for letting the laser ray pass through same and strike the piece to be treated (6), as more clearly shown in the elevational view of FIG. 2. Namely, a Nannetti® brand prototype electric furnace was used in the examples. The furnace comprises different regions at different temperatures.

The beam generated by the continuous laser (7) described above is conducted along an optical path (8) to the deflector (5) which introduces it into the furnace for striking the piece of glass to be treated.

Figure 3:
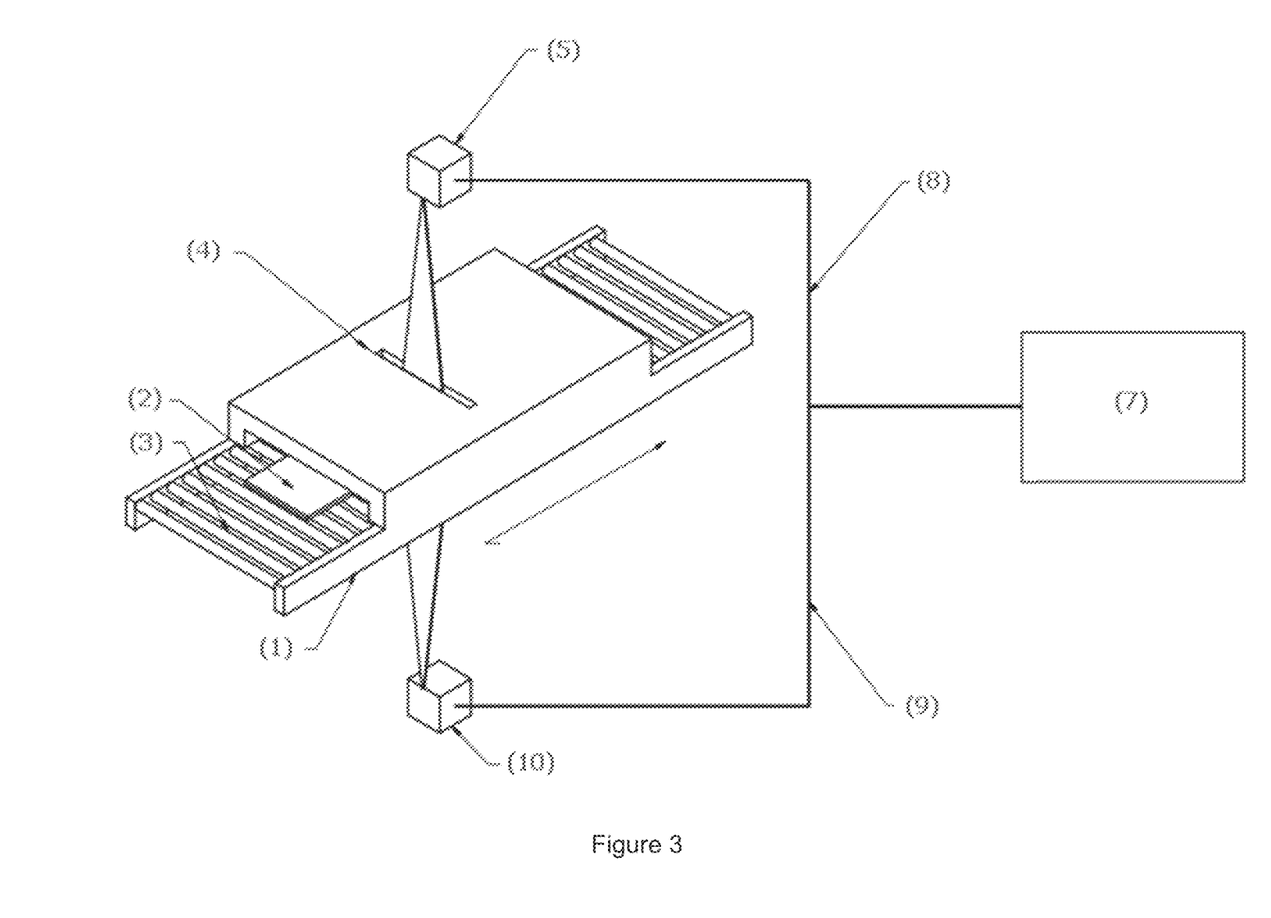
FIG. 3: Perspective view of a particular embodiment of the system of the invention (treatment on two faces).

FIG. 3 shows a very simplified diagram of one of the ways in which the laser emission source can be adapted for this purpose. No scale whatsoever has been maintained in said figure.

The laser source emits a laser beam striking a set of mirrors; in said set of mirrors, at least one of them can perform an oscillation movement about one of their axes of symmetry, by means of a galvanometric system, after which the laser beam strikes a lens, which in turn focuses the beam on the piece on which the process is being carried out. The combination of one or more mirrors capable of rotating about their axes together with sets of lenses allows modifying the scan path of the beam and its focus on the piece to be treated. The focused beam generally travels along a line (segment of length) slightly greater than the width of the piece to be treated. The heating caused by the scanning of the beam causes a strip of molten material (or thermally treated material if this was the object) to be created on the surface of the piece. Therefore, by combining the scanning of the beam with the movement of the piece to be treated, all or part of the surface of said piece is subjected to the desired thermal treatment.

Figure 2:
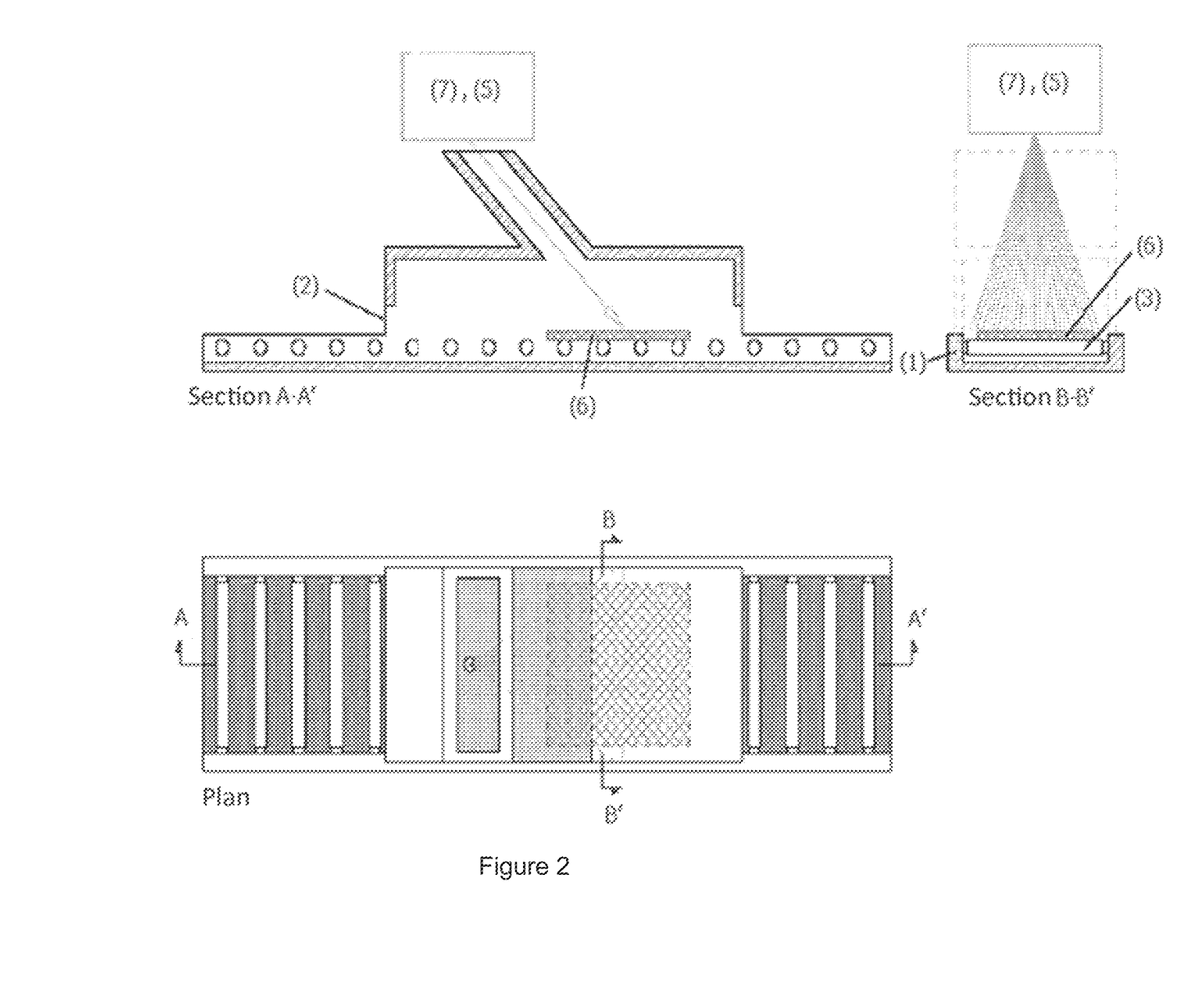
FIG. 2: Plan view and two cross-section views of a particular embodiment of the system of the invention (treatment on one face).

FIG. 2 indicates how a hot line surpassing the lateral boundaries of the surface of the piece of glass (6) is formed by means of a laser ray generating system and the corresponding deflector, which line moves backwards as said piece (6) moves forward, driven by the conveyance system (for example, by rollers (3)).

The pieces are introduced in the furnace by means of the conveyance system described above, following a straight path, at a constant speed. Along the path, said pieces go through different regions of the furnace which are at different temperatures. The temperature in each of said regions is kept constant within a temperature range and laser treatment of the piece takes place in one of said regions.

The laser beam on the surface of the pieces of glass forms a dot with a diameter of 0.8 mm and it is moved with the system of galvanometers describing a line 25 cm long and through a helical movement 3 mm wide. In this example, the power of the laser has been set at a 1700 W and the movement speed of the laser has been set at 25 m/s.

Before beginning the treatments on the pieces of glass, the mechanical properties of pieces of normal glass and of pieces of tempered glass were studied. More specifically, pieces of normal glass (soda-lime glass used for windows) and commercial samples of tempered soda-lime glass used for windows with a quadrangular geometry were used for the tests.

Four-point bending tests were performed on the tempered and untempered pieces in a universal test machine (Instron, series 5560). The dimensions of the pieces used were: 30 cm×30 cm×4 mm, with polished edges. The four-point bending test was performed by separating the two support points 180 mm and by separating the two upper pressure points 60 mm. Each result of the breaking force (N) necessary for fracturing each type of (tempered or untempered) piece was calculated as the arithmetic mean of the individual values obtained for three pieces. In the case of normal glass, an average value of 1670 N was obtained, whereas in tempered glass this value amounted to 4309 N, i.e., it is 2.58 times higher.

It was also found that by making a nick in the glass, normal glass can be cut, whereas tempered glass cannot be cut.

Example 1a: Laser Treatment on a Face of the Piece with Three Steps at a High Temperature In the present example, a series of pieces of soda-lime glass were treated with laser by means of the method of the invention and their mechanical properties were compared to untreated pieces of glass. The dimensions of the pieces of glass in the form of sheet were 30 cm×30 cm×4 mm, with polished edges. The treatment of the piece of the present example comprised three steps at a high temperature (for example, at temperatures greater than 400° C.) and a cooling step.

To compare the mechanical properties of the treated and untreated pieces, a four-point bending test of said pieces was performed in a universal test machine (Instron, series 5560). In said test, the two support points of the pieces were placed at 180 mm and the two upper points were separated 60 mm for the purpose of maintaining the proportions with the pieces measuring 30 cm per side with respect to the pieces measuring 15 cm per side.

Laser treatments were performed on the pieces of glass in the laser furnace as follows:

The piece of glass to be treated was placed in a roller conveyor such that one of its faces having a larger area (30×30 cm) was in contact with said conveyor, and its opposite face was free. Said piece was conveyed at a constant speed (5 m/h) following a straight path inside the furnace. The piece thereby went through different regions of the furnace which were at different temperatures.

The treatment of the piece of the present example comprised three steps at a high temperature (for example, at temperatures greater than 400° C.) and a cooling step. First, the piece to be treated reached a first heating region of the furnace that was at 580° C., then it reached a second region of the furnace that was at 500° C., and finally it reached a third region that was at 580° C. After said treatment, the piece was cooled to room temperature (between 20 and 35° C.). It should be pointed out that the cooling of the piece is a progressive cooling typical of untempered glasses.

In other words, the samples treated in the present example went through three regions of the furnace at different temperatures. It is in the second region of the furnace at 500° C. where laser treatment is performed on one of the faces of the piece measuring 30×30 cm. During said treatment, the laser beam is applied on the piece melting part of the material of the surface of the piece up to a depth of between 0.5 and 1 mm.

During laser treatment, the piece of glass is moved following a path in a straight line at a constant speed of 5 m/h, while the laser performs a scan of 200 mm at 25 m/s following a straight line perpendicular to the path the piece follows. In general, the path the laser follows (back-and-forth movement) is longer than the width of the piece to be treated. In other words, the laser actually "goes beyond" (surpasses) the sides of the surface of the piece to be treated: for example, in pieces measuring 15 cm per side, the laser travels 17 cm. Furthermore, as the piece follows its path along the furnace, the entire surface of the piece is treated with the laser.

The present example shows the results of the bending tests performed on treated pieces of glass at different laser powers. In treatment A, the mean power of the laser was 1750 W and in B it was 2000 W.

Each result of the breaking force obtained by means of the four-point bending test was obtained as the arithmetic mean of the measurements performed in three pieces of glass.

Said results are shown in Table 1 below.

TABLE 1

| Sample | Measured value of the breaking force (N) | Ratio with respect to the original sample |
| --- | --- | --- |
| Original | 1912 | 1.00 |
| Treatment A | 2734 | 1.42 |
| Treatment B | 2942 | 1.54 |

Cutting tests were also performed on the pieces treated with laser, observing that it is possible to make clean cuts without any difficulty.

The results obtained in Table 1 show that after applying the described method, including the described laser treatment, on a piece of glass, a material with a higher breaking force (N) with respect to the untreated material was obtained (an increase by between 42 and 54% of the breaking force according to the results of Table 1 was observed). Furthermore, the cutting tests showed that after laser treatment, a minimum level of stresses was maintained in the treated piece, which allowed notches to be generated and allowed it to be broken in a controlled manner to the desired dimensions. Also, the inventors observed a significant reduction of defects in the pieces treated with laser.

Example 1b: Laser Treatment on a Face of the Piece with Two Steps at a High Temperature The present example shows the results of performing the treatment described above in Example 1a on 50 pieces of glass but without the pieces going through the third region of the furnace. In other words, the treatment of the piece of the present example comprised two steps at a high temperature (for example, at temperatures greater than 400° C.) and a cooling step. More specifically, the piece to be treated entered a first heating region of the furnace which is at 580° C., then it reached a second region of the furnace which is at 500° C., and after that it was cooled to room temperature. It is in the second region of the furnace at 500° C. where the laser treatment of the sample is performed.

Fracturing was observed in 21 of the 50 treated pieces during the process of cooling at room temperature in the seven days after having performed laser treatment due to the stresses stored in the pieces. Likewise, during the six following months, the appearance of internal cracks and fractures is observed in 43 pieces treated with this method.

Example 2: Statistical Study in Pieces with Laser Treatment on One Face

In the present example, a statistical study was performed on the mechanical properties of pieces of glass treated with a laser on one face.

Commercial samples of tempered soda-lime glass used for windows with a quadrangular geometry and with dimensions of the pieces of 15 cm×15 cm per side×4 mm thick, with polished edges, were used for this example.

The pieces of glass were characterized by means of a four-point bending test in a universal test machine (Instron, series 5560). The two support points were separated 100 mm and the two upper pressure points were separated 30 mm.

The statistical parameters characterizing the mechanical properties of glass were determined using Weibull statistic as follows:

$$P_s(V_0) = \exp[-(\sigma/\sigma_0)^m]$$

where $P_s$ is the probability of survival of a piece having a volume $V_0$ when subjected to a stress tension σ. $\sigma_0$ and m are the statistical parameters to be determined and can be assimilated to the fracture stress ($\sigma_0$) and to a defect distribution measurement in the piece (m).

Between 10 and 15 pieces manufactured with the same condition were used to calculate each parameter.

First, commercial samples of glass that had been subjected to the heating and cooling steps described in example 1a but without performing any laser treatment on said samples were measured. After performing statistical analysis (Weibull statistic), a defect distribution value in the piece m=2.8 and a fracture stress value $\sigma_0$=43 MPa are obtained. Furthermore, the measured samples reached typical breaking force values of between 600 and 1400 N.

Commercial samples of glass that had been treated on one of their faces with a laser by means of the method described in Example 1a, but with a laser power of 1700 W, were then measured. During laser treatment, the laser was moved over the sample tracing a line measuring 17 cm long with a scanning speed of 25 m/s, while the sample was moved in the perpendicular direction at a speed of 20 m/h. The treated samples showed m=4.2 and $\sigma_0$=66 MPa as statistical values of their mechanical properties. They furthermore reached breaking force values of up to 2000 N.

The increase in the defect distribution value in the piece "m" indicates that the method of the invention which includes laser treatment is capable of reducing the size distribution of the defects on the surface of the material of the treated pieces of glass.

Furthermore, the results obtained for fracture stress indicate that if a stress of 40 MPa is applied to these materials, in the case of glass without laser treatment, 46% of the pieces would break, whereas in the case of pieces treated by means of the method of the invention which includes laser treatment, only 11% of said pieces would break. Therefore, by means of a treatment with the method of the invention, an improvement in the fracture stress of the treated pieces (a factor of 1.53 times), which is a representative parameter of the mechanical properties, is achieved.

As comparative data, the fracture stress values of commercial glasses published by the companies that sell them were obtained, namely untempered glass: σ=45 MPa
(https://www.saint-gobain-sekurit.com/es/glosario/propiedades-del-vidrio,)
tempered glass: 100<σ<120 MPa
(https://www.saint-aobain-sekurit.com/es/glossary/vidrio-para-automocion)

Example 3: Low-Speed Treatments on One Face

In the present example, treatments were performed on commercial samples of tempered glass used for windows with a quadrangular geometry with the same characteristics and dimensions as in Example 2 described above and using the same geometry for the characterization of their mechanical properties. Laser treatments of the pieces were performed in the same way as described in Example 2 but reducing the forward movement speed of the piece in step (iii).

In pieces processed at forward movement speeds of the piece of 5 m/h, with a laser power of 1700 W, and the laser describing a line 17 cm long at 25 m/s, breaking stress values of 89 MPa, i.e., 2.03 times greater than glass not treated with a laser, were obtained.

Furthermore, upon comparing the results obtained for fracture stress in the present example and with respect to the preceding example, it was observed that by reducing the forward movement speed of the piece through the furnace (from 20 m/h to 5 m/h), while keeping the rest of the conditions constant, the breaking stress values of the pieces were even further improved (from 66 MPa to 89 MPa).

Example 4: Treatment on Two Faces

Figure 4:
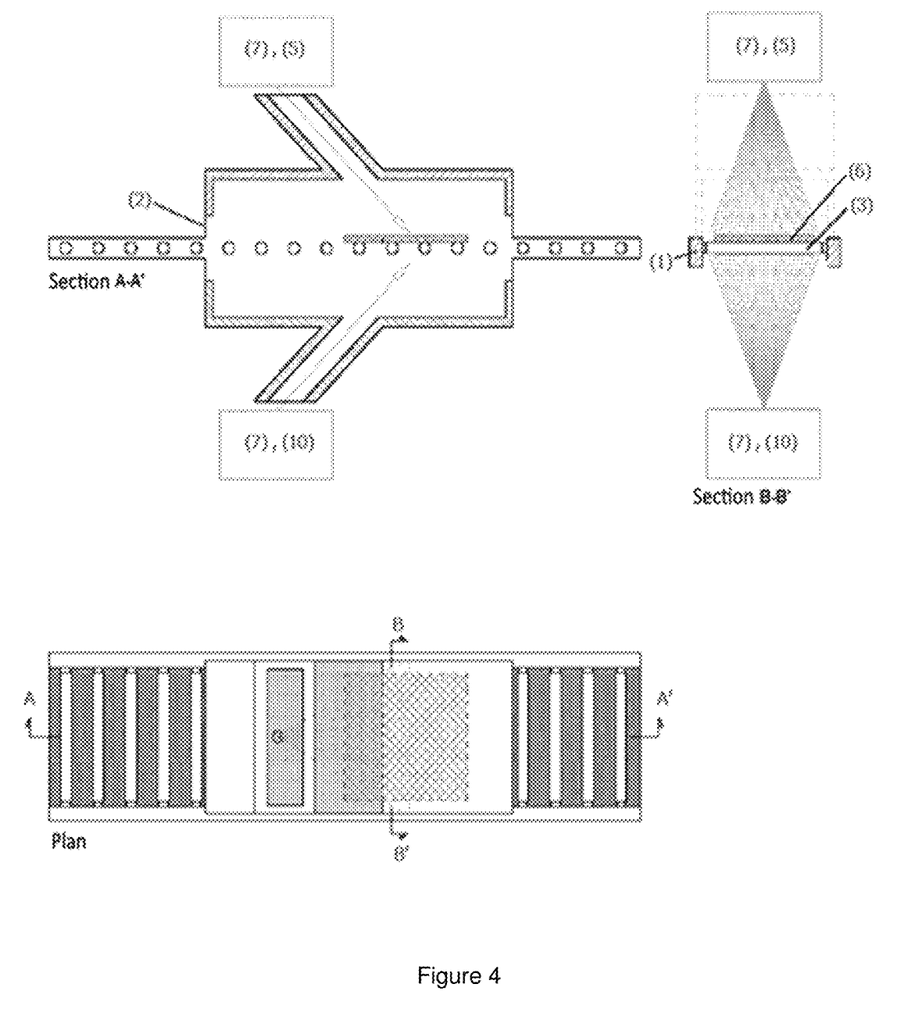
FIG. 4: Plan view and two cross-section views of a particular embodiment of the system of the invention (treatment on two faces).

FIGS. 3 and 4 show a very simplified diagram of the system used in the present invention which consists of a continuous furnace (1) and a laser (7) for treatment on two faces.

The furnace bed (1) has a conventional conveyance system (depicted in the figure by means of a roller conveyor 3) for conveying the pieces of glass to be treated (6) which are introduced into the furnace through the opening (2), having the particularity of containing at the upper and lower parts thereof two inlets (4) (with a certain inclination with respect to the horizontal) so as to allow the laser ray to pass through same and strike (as shown more clearly in the elevational view of FIG. 4) the ceramic piece to be treated (6).

The beam generated in the laser (7) is conducted along an optical path (8) to the deflector (5), which introduces it into the furnace through the upper part, and along the optical path (9) to the deflector (10) which introduces it through the lower groove for striking both faces of the piece of glass.

A possible variant could be to use two lasers, one laser for the optical path (8) and the deflector (5) for the treatment on the upper face, and a second laser for use in the optical path (9) and the deflector (10) for the treatment on the upper face.

FIG. 4, which shows a drawing of a plan view and two cross-sections (A-A' and B-B') of the furnace, indicates how a fan which generates a "hot" line on the surface is formed by means of a laser ray generating system and the corresponding deflector, surpassing the lateral boundaries of the surface of the piece of glass (6), which line moves backwards as said piece moves forward driven by the rollers (3) or equivalent drive system.

A laser treatment was performed in this example on commercial samples of tempered glass used for windows with a quadrangular geometry with the same characteristics and dimensions as in Example 2 described above and using the same geometry for the characterization of their mechanical properties. Nevertheless, said laser treatment was performed first on one face (15 cm×15 cm) and then on the opposite face of the pieces. Each of the treatments was performed as described in Example 2 with a laser power of 1700 W, describing a line measuring 17 cm by means of a back-and-forth movement at 25 m/s and moving the piece at 20 m/h through the furnace. The results of the mechanical tests showed an improvement in the mechanical properties after said treatment, the values of the Weibull statistic obtained were m=5.3 and σ₀=56 MPa. With these conditions, under an applied stress of 40 MPa, 16% of the pieces would break, compared with 46% of the cases in which breaking would occur in untreated glass.

The invention claimed is:

1. A method of treating a vitreous material comprising the following steps:
   i. providing
      a. a piece of vitreous material; wherein said piece of vitreous material comprises at least two opposite faces; and
      b. at least one laser beam source;
   ii. heating the piece of vitreous material of step (i) at a temperature comprised between 400 and 640° C.;
   iii. applying at least one laser beam with the at least one laser beam source of step (i) on at least one of the faces of the piece of vitreous material of step (ii), performing a scan following a line surpassing the opposite edges of the at least one of the faces of the piece of vitreous material;
   while the piece of vitreous material moves following a path forming an angle of between 30 and 120° with the scan line of the laser beam; wherein said scan is performed while the piece of vitreous material is at a temperature comprised between 400° C. and 640° C.;
   iv. heating the piece of vitreous material obtained in step (iii) at a temperature comprised between 450° C. and 650° C.; and
   v. cooling the piece of vitreous material of step (iv);
   wherein the laser beam and the at least one of the faces of the piece of vitreous material form an angle of between 15 and 90°; wherein the laser beam is focused on a point of the face of the piece of material, wherein the scan follows a line surpassing the opposite edges of the face of the piece of vitreous material of step (iii), said scan being performed in a direction from a first point to a second point; once said laser beam reaches the second point, the laser beam performs the same scan but in the opposite direction until reaching the first point; wherein the scan is performed by oscillating movement following a straight line surpassing the two opposite edges of the face of the piece of vitreous material.

2. The method according to claim 1, wherein the piece of vitreous material of step (i) is a piece of glass.

3. The method according to claim 1, wherein the scan follows a straight line surpassing the two opposite edges of the at least one of the faces of the piece of vitreous material; and
   the path that the piece of vitreous material follows by a translational movement follows a straight line which is perpendicular to the scan line of the laser beam.

4. The method according to claim 1, wherein the movement of the piece of vitreous material is performed at a constant speed.

5. The method according to claim 1, wherein the scanning of the laser beam is performed at a constant speed greater than 1 m/s.

6. The method according to claim 1, wherein the laser beam source is a $CO_2$ laser source.

7. The method according to claim 1, wherein the laser beam application is performed on two opposite faces of the piece of vitreous material.

8. The method according to claim 1, wherein the temperature of the piece of vitreous material in step (v) is reduced at a speed of less than 70° C./min.

9. The method according to claim 1, wherein the temperature of the piece of vitreous material in step (iv) is greater than the temperature of said piece in step (iii), and/or wherein the temperature of said piece in step (v) is reduced until reaching room temperature.

10. A modified vitreous material obtainable by the method defined in claim 1.

11. The vitreous material according to claim 10, wherein said vitreous material has a fracture stress value "$\sigma_0$" between 56 MPa and 89 MPa.

12. The vitreous material according to claim 10, wherein said vitreous material has a defect distribution measurement value "m" comprised between 2 and 10.

13. The vitreous material according to claim 10, wherein said vitreous material allows cutting without multiple fracturing in the volume of the vitreous material.

* * * * *